US007238733B2

(12) United States Patent
Vijn et al.

(10) Patent No.: US 7,238,733 B2
(45) Date of Patent: Jul. 3, 2007

(54) STORABLE WATER-SILICA SUSPENSIONS AND METHODS

(75) Inventors: Jan Pieter Vijn, Leiderdorp (NL); Bach Dao, Nieuw Vennep (NL)

(73) Assignee: Halliburton Energy Services, Inc.

( * ) Notice: Subject to any disclaimer, the term of this patent is extended or adjusted under 35 U.S.C. 154(b) by 66 days.

(21) Appl. No.: 10/953,226

(22) Filed: Sep. 29, 2004

(65) Prior Publication Data

US 2005/0038127 A1 Feb. 17, 2005

Related U.S. Application Data

(62) Division of application No. 10/103,069, filed on Mar. 21, 2002.

(51) Int. Cl.
*C09K 8/00* (2006.01)
*C08K 3/36* (2006.01)

(52) U.S. Cl. .................. 523/130; 523/131; 523/132; 524/492

(58) Field of Classification Search .............. 523/130, 523/131, 132; 524/492
See application file for complete search history.

(56) References Cited

U.S. PATENT DOCUMENTS

| 2,805,719 | A | | 9/1957 | Anderson et al. ............. 166/29 |
|---|---|---|---|---|
| 3,131,075 | A | | 4/1964 | Brooks, Jr. .................. 106/90 |
| 3,175,628 | A | * | 3/1965 | Dellinger ..................... 175/72 |
| 3,360,046 | A | | 12/1967 | Johnson et al. ............... 166/29 |
| 3,745,109 | A | * | 7/1973 | Darley ........................ 175/66 |
| 3,784,499 | A | | 1/1974 | Krupnick et al. ....... 260/29.6 S |
| 3,902,911 | A | | 9/1975 | Messenger ................... 106/97 |
| 3,985,593 | A | | 10/1976 | Machacek .................... 149/62 |
| 4,081,299 | A | | 3/1978 | Griffith ....................... 149/41 |
| 4,104,092 | A | | 8/1978 | Mullay ......................... 149/2 |
| 4,234,344 | A | | 11/1980 | Tinsley et al. ................ 106/88 |
| 4,370,166 | A | | 1/1983 | Powers et al. ................ 106/97 |
| 4,384,896 | A | | 5/1983 | Aitcin et al. ............ 106/288 B |
| 4,515,635 | A | | 5/1985 | Rao et al. ..................... 106/90 |
| 4,519,923 | A | * | 5/1985 | Hori et al. .................... 507/112 |
| 4,543,137 | A | | 9/1985 | Edamura et al. ............. 149/21 |
| 4,555,269 | A | | 11/1985 | Rao et al. ..................... 106/90 |
| 4,618,376 | A | | 10/1986 | Saternus et al. ............. 134/26 |
| 4,623,390 | A | | 11/1986 | Delmonico .............. 106/15.05 |
| 4,687,516 | A | | 8/1987 | Burkhalter et al. ........... 106/90 |
| 4,721,160 | A | | 1/1988 | Parcevaux et al. .......... 166/293 |
| 4,829,107 | A | | 5/1989 | Kindt et al. ..................... 524/3 |
| 4,897,119 | A | | 1/1990 | Clarke ........................ 106/117 |
| 4,904,709 | A | | 2/1990 | Hermele ..................... 523/220 |
| 4,933,031 | A | | 6/1990 | Blomberg et al. .......... 106/679 |
| 4,935,060 | A | | 6/1990 | Dingsoyr .................... 106/719 |
| 5,028,482 | A | | 7/1991 | Jeffs ............................. 428/323 |
| 5,158,613 | A | | 10/1992 | Sargeant et al. ............. 106/737 |
| 5,207,832 | A | | 5/1993 | Baffreau et al. ............. 106/727 |
| 5,292,512 | A | | 3/1994 | Schafer et al. ............... 524/401 |
| 5,346,012 | A | | 9/1994 | Heathman et al. .......... 166/293 |
| 5,489,574 | A | | 2/1996 | Miano et al. ................ 507/203 |
| 5,723,416 | A | * | 3/1998 | Liao ............................ 507/110 |
| 5,919,842 | A | | 7/1999 | Mounsey ..................... 523/412 |
| 6,060,535 | A | | 5/2000 | Villar et al. ................. 523/130 |
| 6,136,867 | A | | 10/2000 | Frouin et al. .................. 516/80 |
| 6,153,562 | A | | 11/2000 | Villar et al. ................. 507/269 |
| 6,156,808 | A | | 12/2000 | Chatterji et al. ............ 516/116 |
| 6,173,778 | B1 | | 1/2001 | Rae et al. .................... 166/293 |
| 6,196,316 | B1 | | 3/2001 | Bosma et al. ............... 166/294 |
| 6,258,160 | B1 | | 7/2001 | Chatterji et al. ............ 106/705 |
| 6,268,406 | B1 | | 7/2001 | Chatterji et al. ............ 523/130 |
| 6,297,202 | B1 | | 10/2001 | Chatterji et al. ............ 507/261 |
| 6,471,975 | B1 | | 10/2002 | Banovetz et al. ........... 424/408 |
| 6,644,405 | B2 | | 11/2003 | Vijn et al. ................... 166/293 |

FOREIGN PATENT DOCUMENTS

| CN | 1250071 | 9/1999 |
|---|---|---|
| DE | 3522677 A1 | 1/1987 |
| DE | 296 474 A5 | 12/1991 |
| DE | EP 0 492 087 A2 | 12/1996 |
| EP | 650942 | 10/1994 |
| EP | 0 748 782 A1 | 12/1996 |
| EP | 814067 | 6/1997 |
| EP | 0 832 861 B1 | 7/2001 |
| ES | 2114781 | 11/1994 |
| FR | 2779425 | 5/1998 |
| JP | 2002193701 | 12/2000 |
| JP | 2001019421 A | 1/2001 |
| JP | 2001354408 A | 12/2001 |
| JP | 2002145609 A | 5/2002 |
| JP | 2003176123 A | 6/2003 |

(Continued)

OTHER PUBLICATIONS

Halliburton brochure entitled "Spherelite Cement Additve" dated 1999.

(Continued)

*Primary Examiner*—Tae H Yoon
(74) *Attorney, Agent, or Firm*—Craig W. Roddy; Haynes & Boone, LLP

(57) ABSTRACT

Storable water-silica suspensions and methods of cementing well bores are provided. The storable water-silica suspensions are basically comprised of water, silica and an effective amount of a suspending agent selected from the group consisting of colloidal materials, clays and gel forming polymers.

25 Claims, No Drawings

FOREIGN PATENT DOCUMENTS

| | | |
|---|---|---|
| NO | 167649 | 7/1993 |
| WO | WO 90/11977 | 10/1990 |
| WO | WO 93/09332 | 5/1993 |
| WO | WO 98/38855 | 9/1998 |

OTHER PUBLICATIONS

Paper entitled "Cementing" by Dwight K. Smith, pp. 21-27, 1990.

Halliburton brochure entitled "SSA-1 Strength-Stabilizing Agent" dated 1998.

Halliburton brochure entitled "MICROSAND Cement Additive" dated 1999.

Halliburton brochure entitled "SSA-2 Coarse Silica Flour" dated 1999.

Halliburton brochure entitled "Microblock Cement Additive" dated 1999.

Halliburton brochure entitled "Silicalite Cement Additive" dated 1999.

Grace Construction Products brochure entitled "Force 10,000 Mechanical Properties of Force 10,000 Microsilica Concrete", dated 1999.

Grace Construction Products brochure entitled "Force 10,000 D High Performance Concrete Admixture Dry Densified Powder", dated 2002.

Grace Construction Products brochure entitled "Force 10,000 Water and Gas Permeability of Force 10,000 Microsilica Concrete", dated 1999.

* cited by examiner

STORABLE WATER-SILICA SUSPENSIONS AND METHODS

This application is a Divisional of U.S. patent application Ser. No. 10/103,069 filed Mar. 21, 2002.

BACKGROUND OF THE INVENTION

1. Field of the Invention

The present invention relates to storable water-silica suspensions and methods of cementing wells.

2. Description of the Prior Art

Hydraulic cement compositions are commonly utilized in subterranean well completion and remedial operations. For example, hydraulic cement compositions are used in primary cementing operations whereby strings of pipe such as casings and liners are cemented in well bores. In performing primary cementing, a hydraulic cement composition is pumped into the annular space between the walls of a well bore and the exterior surfaces of a pipe string disposed therein. The cement composition is permitted to set in the annular space thereby forming an annular sheath of hardened substantially impermeable cement therein. The cement sheath physically supports and positions the pipe string in the well bore and bonds the exterior surfaces of the pipe to the walls of the well bore whereby the undesirable migration of fluids between zones or formations penetrated by the well bore is prevented.

When temperatures in the well bore exceed about 230° F., silica has heretofore been included in the cement composition to prevent cement strength retrogression whereby the strength of the set cement composition decreases and the permeability of the set cement increases. As a result of such strength retrogression, pressurized formation fluids can enter the well bore which is highly disadvantageous.

The degradation of Portland and the equivalent set cement compositions first occurs in the range of from about 210° F. to about 230° F. This degradation has heretofore been prevented by the addition of crystalline silica such as fine silica flour to the cement composition which forms tobermorite gel in the cement composition. The tobermorite is stable up to a temperature in the range of from about 300° F. to about 330° F. To maintain the strength of the cement composition above about 300° F., crystalline silicas such as silica flour or a mixture of silica flour and sand must be present to form truscottolite or xontolite gel in the cement which prevents strength retrogression. Thus, fine silica flour, silica flour, sand, and a mixture of silica flour and sand depending upon the temperature encountered by the cement composition have heretofore been used to prevent strength retrogression of set cement compositions.

Suspensions of micro-silica, fine silica flour, silica flour, sand and mixtures thereof in water have been used heretofore in various applications including in well cements to prevent set cement strength retrogression. The water-silica suspensions are convenient for transferring the silica into a cement composition. That is, the water-silica suspensions can be added to a cement composition mixing water thereby avoiding silica dust which if inhaled is detrimental to human health. The water-silica suspensions can be prepared on shore and shipped to well locations in containers or drums. However, the water-silica suspensions used heretofore settle and separate over time, and as a result, agitating equipment during storage of the suspensions must be utilized to prevent such settling and the formation of hard cake in the bottoms of containers.

Thus, there are needs for improved water-silica suspensions which are highly resistant to settling and which after being stored can simply and easily be stirred and poured prior to use.

SUMMARY OF THE INVENTION

The present invention provides storable water-silica suspensions for use in various applications including in well cementing compositions and methods of cementing well bores which meet the needs described above and overcome the deficiencies of the prior art. In one aspect of the present invention, storable water-silica suspensions are provided. While being stored, the water-silica suspensions do not settle over time and produce hard cake during storage which requires agitation equipment to prevent. The storable water-silica suspensions are basically comprised of water, silica and an effective amount of a suspending agent selected from the group consisting of colloidal materials, clays and gel forming polymers. The silica utilized in the suspensions of this invention can be micro-silica, fine silica flour, silica flour, sand and mixtures of such silicas.

The methods of the present invention of cementing well bores are comprised of the following steps. A water-silica suspension for preventing cement strength retrogression is stored comprised of water, silica and an effective amount of a suspending agent selected from the group of colloidal materials, clays and gel forming polymers. The water-silica suspension is combined with a cement composition comprised of a hydraulic cement and water. Thereafter, the cement composition including the water-silica suspension is introduced into the well bore and the cement composition is allowed to set therein.

The objects, features and advantages of the present invention will be readily apparent to those skilled in the art upon a reading of the description of preferred embodiments which follows.

DESCRIPTION OF PREFERRED EMBODIMENTS

As mentioned above, silica is utilized in a variety of applications where it is blended with other materials. For example, silica is commonly blended with cement which produces silica dust hazardous to personnel, particularly on off-shore well drilling platforms. To avoid this hazard, silica has heretofore been added to water and the resulting suspension formed has been shipped to the location of use in tanks or drums where they are stored until the silica suspension is needed. However, such water-silica suspensions have heretofore suffered from the disadvantage that they develop free water, settle over time and produce hard cake during storage, all of which require agitation equipment to prevent. The present invention provides stabilized water-silica suspensions which are highly resistant to settling whereby the suspensions can be stored for long periods of time without agitation.

A storable water-silica suspension of this invention which does not require agitation for preventing the development of free water, settling and the like is basically comprised of water, silica and an effective amount of a suspending agent selected from microfine particulate colloidal materials, clays and gel forming polymers.

The water utilized to form a storable water-silica suspension of this invention can be fresh water or salt water. The term "salt water" is used herein to mean unsaturated salt solutions and saturated salt solutions including brine and seawater. Generally, water from any source can be utilized so long as the water does not react with silica or other components in cement compositions to which the water-silica suspensions are added.

The silica utilized in the water-silica suspensions of this invention can be micro-silica, fine silica flour, silica flour, sand or mixtures thereof. Micro-silica is amorphous silica and has a particle size of less than 1 micron. Fine silica flour is crystalline silica and has a particle size smaller than 20 microns. Silica flour is crystalline silica which is produced by grinding sand. The particle size of silica flour is generally in the range of from about 20 to about 40 microns. Sand is also crystalline silica and the sand can have a particle size in the range of from about 80 to about 500 microns.

As mentioned, silica is included in well cement compositions to prevent strength retrogression when the well exceeds about 230° F. Set cement composition strength retrogression occurs at temperatures which cause the initially formed reaction products in the cement composition to be converted to secondary reaction products. The conversion causes the set cement composition to decrease in compressive strength and to increase in permeability. Both the decrease in compressive strength and the increase in permeability are detrimental to the function of the set composition, i.e., centering the pipe string in the well bore and preventing pressurized formation fluids from entering the well bore. There are two high temperature ranges where cement strength retrogression can occur. The first is a temperature range of from about 210° F. to about 230° F. When the set cement composition reaches that range, the calcium silicate hydrate gel in the cement reacts to alpha calcium silicate hydrate which causes degradation of the cement. This initial degradation is prevented by the addition of either amorphous or crystalline silica to the cement composition so that when the composition sets, tobermorite is formed which does not degrade until a temperature range of from about 300 to about 320° F. is reached. That is, when about 300° F. is reached, the cement composition again degrades unless crystalline silica has been added to the cement composition which forms a stable reaction product upon setting, i.e., truscottolite or xontolite. Thus, if a cement composition will reach a temperature range of from about 210° F. to about 230° F., the degradation of the set cement can be avoided by including crystalline silica such as fine silica flour, silica flour or mixtures thereof in the cement composition. Fly ash and ground blast furnace slag are amorphous silica sources that can also be used to prevent strength retrogression to at least 300° F. If the cement composition will reach the higher temperature range of from about 300° F. to about 330° F., crystalline silica must be added to the cement composition to prevent degradation, i.e., silica flour, sand or mixtures thereof must be added to the cement composition. Generally, in order to prevent the degradation caused by set cement strength retrogression, water suspensions containing fine silica flour, silica flour, sand or mixtures thereof must be included in cement compositions.

The silica utilized in a water-silica suspension of this invention is present therein in a general amount in the range of from about 50% to about 250% by weight of the water in the suspension, preferably in an amount in the range of from about 150% to about 233% and more preferably in an amount of about 175%.

The suspending agent in the water-silica suspension functions to prevent water separation and settling in the suspension during its storage. In accordance with the present invention, the suspending agent is selected from fine particulate materials, (less than 1 micron) hereinafter referred to as colloidal materials, clays and gel forming polymers. Examples of colloidal materials which can be used include, but are not limited to, carbon black, lignite, brown coal, humic acid, styrene-butadiene rubber latexes, polyvinyl alcohol latexes, acetate latexes, acrylate latexes, precipitated silica and pyrogenic silica (such as an oxidation product of $SiO_2$, $SiH_4$, $SiCl_4$ or $HSiCl_3$). Of these, carbon black is presently preferred. The clays which can be utilized include, but are not limited to, bentonite, attapulgite, kalonite, meta kalonite, hectorite and sepiolite. Of these, bentonite is preferred. The polymers which can be used include, but are not limited to, a copolymer of 2-acrylamido-2-methylpropane sulfonic acid and N,N-dimethylacrylamide, carragenan, scleroglucan, xanthan gum, guar gum, hydroxyethylcellulose, carboxymethylhydroxyethylcellulose, hydroxypropylguar, welan gum, acrylic acid copolymers and terpolymers and vinyl acetate copolymers and terpolymers. Of these, a copolymer of 2-acrylamido-2-methylpropane sulfonic acid and N,N-dimethylacrylamide is preferred.

One or more of the above described suspending agents are generally included in a water-silica suspension of this invention in an amount in the range of from about 0.1% to about 100% by weight of the water in the suspension. When the suspending agent is a colloidal material as described above, the colloidal material in powder form is preferably included in the water-silica suspension in an amount in the range of from about 5% to about 50% by weight of water therein, more preferably in an amount of about 30%. When the suspending agent is a clay as described above, the clay is preferably included in the water-silica suspension in an amount in the range of about 0.5% to about 8% by weight of water in the suspension, more preferably in an amount of about 5%. When the suspending agent is a polymer described above, the polymer is preferably included in the water-silica suspension in an amount in the range of from about 0.1% to about 3% by weight of water therein, more preferably in an amount of about 1%.

The methods of cementing a well bore of the present invention are basically comprised of the following steps. A water-silica suspension for preventing cement strength retrogression comprised of water, silica and an effective amount of a suspending agent selected from the group of colloidal materials, clays and gel forming polymers is stored. Thereafter, the water-silica suspension is combined with a cement composition comprised of a hydraulic cement and water. The cement composition including the water-silica suspension is introduced into a well bore and the cement composition is allowed to set therein.

The hydraulic cements utilized in the cement composition can be those comprised of calcium, aluminum, silicon, oxygen and/or sulfur which set and harden by reaction with water. Such hydraulic cements include Portland cements, pozzolana cements, gypsum cements, high aluminum content cements, silica cements, high alkalinity cements and slag cements. The cements can be of conventional particle sizes or they can be of ultra-fine particle sizes. Portland cements are generally preferred for use in accordance with this invention. Portland cements of the types defined and described in *API Specification For Material And Testing For Well Cements*, API Specification 10, 5$^{th}$ Edition, dated Jul. 1, 1990 of the American Petroleum Institute are particularly suitable. Preferred such API Portland cements include classes A, B, C, G and H, with API classes G and H being more preferred and class G being the most preferred.

The water utilized in the cement composition can be fresh water or salt water. As mentioned above, the term "salt water" is used herein to mean unsaturated salt solutions and saturated salt solutions including brines and seawater. The water is generally present in the cement composition in an amount sufficient to form a pumpable slurry, generally an amount in the range of from about 38% to about 56% by weight of cement in the slurry. The components of the water-silica suspension utilized in accordance with the methods of this invention are the same as those described above and are utilized in the same amounts set forth above.

A preferred storable water-silica suspension of this invention for use in any of a variety of applications is comprised of water; silica selected from the group consisting of microsilica, silica flour or mixtures thereof; and an effective amount of a suspending agent selected from the group consisting of colloidal materials, clays and gel forming polymers.

A preferred storable water-silica suspension of this invention for use in well cement compositions comprises: water; silica selected from the group consisting of fine silica flour, silica flour, sand and mixtures thereof present in the suspension in an amount in the range of from about 100% to about 250% by weight of water therein; and a colloidal suspending agent selected from the group consisting of carbon black, lignite, brown coal, humic acid, styrene-butadiene rubber latexes, polyvinyl alcohol latexes, acetate latexes, acrylate latexes, precipitate silica and pyrogenic silica present in the suspension in an amount in the range of from about 25% to about 100% by weight of water therein.

Another preferred storable water-silica suspension of this invention for use in well cement compositions comprises: water; silica selected from the group consisting of fine silica flour, silica flour, sand and mixtures thereof present in the suspension in an amount in the range of from about 50% to about 250% by weight of water therein; and a clay suspending agent selected from the group consisting of bentonite, attapulgite, kalonite, meta kalonite, hectorite and sepiolite, present in the suspension in an amount in the range of from about 0.5% to about 8% by weight of water therein.

Yet another preferred storable water-silica suspension for use in well cement compositions of this invention comprises: water; silica selected from the group consisting of fine silica flour, silica flour, sand and mixtures thereof present in the suspension in an amount in the range of from about 50% to about 250% by weight of water therein; and a polymer suspending agent selected from the group consisting of a copolymer of 2-acrylamido-2-methylpropane sulfonic acid and N,N-dimethylacrylamide, carragenan, scleroglucan, xanthan gum, guar gum, hydroxyethylcellulose, carboxymethylhydroxyethylcellulose, hydroxypropylguar, welan gum, acrylic acid copolymers and terpolymers and vinyl acetate copolymers and terpolymers present in the suspension in an amount in the range of from about 0.1% to about 3.0% by weight of water therein.

A preferred method of cementing a well bore of this invention comprises the steps of: (a) storing a water-silica suspension for preventing cement strength retrogression comprised of water, silica selected from the group consisting of fine silica flour, silica flour, sand and mixtures thereof present in the suspension in an amount in the range of from about 50% to about 250% by weight of water therein and a colloidal suspending agent selected from the group consisting of carbon black, lignite, brown coal, humic acid, styrene-butadiene rubber latexes, polyvinyl alcohol latexes, acetate latexes, acrylate latexes, precipitate silica and pyrogenic silica present in the suspension in an amount in the range of from about 25% to about 100% by weight of water therein; (b) combining the water-silica suspension with a cement composition comprised of a hydraulic cement and water; (c) introducing the cement composition including the water-silica suspension into the well bore; and (d) allowing the cement composition to set. The most preferred colloidal suspending agent for use in the above described method is carbon black.

Another method of cementing a well bore of the present invention comprises the steps of: (a) storing a water-silica suspension for preventing cement strength retrogression comprised of water, silica selected from the group consisting of fine silica flour, silica flour, sand and mixtures thereof present in the suspension in an amount in the range of from about 50% to about 250% by weight of water therein and a clay suspending agent selected from the group consisting of bentonite, attapulgite, kalonite, meta kalonite, hectorite and sepiolite present in the suspension in an amount in the range of from about 0.5% to about 8% by weight of water therein; (b) combining the water-silica suspension with a cement composition comprised of a hydraulic cement and water; (c) introducing the cement composition including the water-silica suspension into the well bore; and (d) allowing the cement composition to set. The most preferred clay suspending agent for use in the above described method is bentonite.

Yet another method of cementing in a well bore in accordance with the present invention comprises the steps of: (a) storing a water-silica suspension for preventing cement strength retrogression comprised of water, silica selected from the group consisting of fine silica flour, silica flour, sand and mixtures thereof present in the suspension in an amount in the range of from about 50% to about 250% by weight of water therein and a polymer suspending agent selected from the group consisting of a copolymer of 2-acrylamido-2-methylpropane sulfonic acid and N,N-dimethylacrylamide, carragenan, scleroglucan, xanthan gum, guar gum, hydroxyethylcellulose, carboxymethylhydroxyethylcellulose, hydroxypropylguar, welan gum, acrylic acid copolymers and terpolymers and vinyl acetate copolymers and terpolymers present in the suspension in an amount in the range of from about 0.1% to about 3% by weight of water therein; (b) combining the water-silica suspension with a cement composition comprised of a hydraulic cement and water; (c) introducing the cement composition including the water-silica suspension into the well bore; and (d) allowing the cement composition to set. The most preferred polymer suspending agent for use in the above described method is a copolymer of 2-acrylamido-2-methylpropane sulfonic acid and N,N-dimethylacrylamide In order to further illustrate the storable water-silica suspensions and methods of cementing in a well bore in accordance with the present invention, the following example is given.

EXAMPLE

Silica flour was suspended in fresh water containing colloidal carbon black in an amount of 177% silica flour by weight of water in the resulting suspension. The colloidal carbon black suspending agent was present in the suspension in an amount of about 40% by weight of water in the resulting suspension. The suspension identified as Sample No. 1 was stored and monitored over a period of 6 weeks. That is, the sample was examined for free water, settling, whether it was gelled and whether it was re-stirrable to its original consistency after 3 days, after 1 week, after 3 weeks, and after 6 weeks. The results of these tests are given in the Table below.

In Sample No. 2, silica flour was suspended in fresh water containing prehydrated bentonite suspending agent in an amount to produce a suspension containing 150% silica flour by weight of water in the suspension. The bentonite suspending agent was present in the suspension in an amount of 5% by weight of water in the suspension. The suspension was stored and the stability of the suspension was monitored after 3 days, after 3 weeks and after 6 weeks. The results of these tests are also given in the Table below.

by weight of water in the suspension and carragenan polymer in an amount of 0.5% by weight of water in the suspension. Samples Nos. 4 and 5 were stored and monitored after 3 days and after 3 weeks. The results of these tests are also given in the Table below. In addition, the densities of Samples Nos. 1 through 5 were calculated and the Fann dial readings of the samples after preparation were determined which are given in the Table below.

TABLE

| Test Sample Components, Properties And Stability | Sample No. | | | | |
| --- | --- | --- | --- | --- | --- |
| | 1 | 2 | 3 | 4 | 5 |
| Water | | | | | |
| Carbon Black, % by wt. of water in the suspension | 40 | — | — | — | — |
| Bentonite, % by wt. of water in the suspension | — | 5.0 | — | — | — |
| Carragenan, % by wt. of water in the suspension | — | — | 0.5 | — | 0.5 |
| Copolymer[1], % by wt. of water in the suspension | — | — | — | 0.01 | — |
| Silica Flour, % by wt. of water in the suspension | 177 | 150 | 100 | 150 | — |
| Silica Sand, % by wt. of water in the suspension | — | — | 50 | — | 226 |
| Density[2], lb./gal. | 1.66 | 1.62 | 1.61 | 1.66 | 1.75 |
| Fann Dial Readings at Rheology, 300-200-100-6-3 rpm | 141-112-80-32-29 | 116-86-57-10-8 | 160-134-101-45-42 | 300+-285-200-12-11 | 262-190-112-16-11 |
| After Three Days | | | | | |
| Free Water | No | Trace | No | 1%[3] | Trace |
| Settling | No | No | No | No | Trace |
| Re-Stirrable | Yes | Yes | Yes | Yes | Yes |
| Gelled | Yes | No | No | No | No |
| After One Week | | | | | |
| Free Water | No | — | — | — | 1%[3] |
| Settling | No | — | — | — | Slight |
| Re-Stirrable | Yes | — | — | — | Yes |
| Gelled | Yes | — | — | — | No |
| After Three Weeks | | | | | |
| Free Water | No | 4%[3] | No | 2%[3] | 3.6%[3] |
| Settling | No | No | No | Yes[4] | Yes |
| Re-Stirrable | Yes | Yes | Yes | No | No |
| Gelled | Yes | No | No | No | No |
| After Six Weeks | | | | | |
| Free Water | No | — | — | — | — |
| Settling | No | — | — | — | — |
| Re-Stirrable | Yes | — | — | — | — |
| Gelled | Yes | — | — | — | — |

[1]copolymer of acrylamido-2-methylpropane sulfonic acid and N,N-dimethylacrylamide
[2]density was calculated
[3]percent by volume
[4]settled silica was hard Additional Samples Nos. 3, 4 and 5 were prepared by suspending silica flour and/or silica sand in solutions containing a carragenan polymer or copolymer of 2-acrylamido-2-methylpropane sulfonic acid and N,N-dimethylacrylamide having a molecular weight of 500.000 to 2.000.000 dalton. Sample No. 3 contained 100% silica flour by weight of water in the suspension and 50% silica sand by weight of water in the suspension and a carragenan polymer suspending agent in an amount of 0.5% by weight of water in the suspension. Sample No. 3 was stored ad monitored after 3 days, after 3 weeks and after 6 weeks. The results of these tests are also given in the Table below. Sample No. 4 contained only silica flour in an amount of 150% by weight of water in the suspension and a copolymer of 2-acrylamido-2-methylpropane sulfonic acid and N,N-dimethylacrylamide in an amount of 0.01% by weight of water in the suspension. Sample No. 5 contained silica sand in an amount of 226%

From the test results set forth in the Table, it can be seen that Sample No. 1 did not develop free water and settling did not occur at any time during the 6 weeks of storage. Further, the suspension was gelled, but was re-stirrable to its original consistency. Sample No. 2 developed free water and was not gelled, but no settling occurred. Sample No. 2 was re-stirrable to its original consistency. Sample No. 3 did not develop free water, settling did not occur and it was not gelled. The suspension was stable for the 6 weeks it was monitored and did not require re-stirring before use. Sample No. 4 developed free water and settling occurred after 3 weeks. Sample No. 4 could be utilized by re-stirring after being stored for about 1 week. Sample No. 5 developed free water after 3 days and settling occurred thereafter. Sample No. 5 could also be used after storage for up to 1 week if re-stirred.

Thus, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A storable water-silica suspension comprising: water; silica selected from the group consisting of micro-silica, fine silica flour, silica flour, sand, and mixtures thereof; and an effective amount of a suspending agent comprising a copolymer of 2-acrylamido-2-methylpropane sulfonic acid and N,N-dimethylacrylamide.

2. The suspension of claim 1 wherein said water is selected from the group consisting of fresh water and salt water.

3. The suspension of claim 1 wherein said silica is present in said suspension in an amount in the range of from about 50% to about 250% by weight of said water in said suspension.

4. The suspension of claim 1 wherein said suspension further comprises a colloidal material selected from the group consisting of carbon black, lignite, brown coal, humic acid, styrene-butadiene rubber latexes, polyvinyl alcohol latexes, acetate latexes, acrylate latexes, precipitated silica and pyrogenic silica.

5. The suspension of claim 1 wherein said suspension further comprises a clay selected from the group consisting of bentonite, attapulgite, kalonite, meta kalonite, hectorite and sepiolite.

6. The suspension of claim 1 wherein said suspending agent is present in said suspension in an amount in the range of from about 0.1% to about 100% by weight of said water in said suspension.

7. A storable water-silica suspension for use in well cement compositions comprising: water; silica; and an effective amount of a suspending agent comprising a copolymer of 2-acrylamido-2-methylpropane sulfonic acid and N,N-dimethylacrylamide.

8. The suspension of claim 7 wherein said water is selected from the group consisting of fresh water and salt water.

9. The suspension of claim 7 wherein said silica is selected from the group consisting of micro-silica, fine silica flour, silica flour, sand and mixtures thereof.

10. The suspension of claim 7 wherein said silica is present in said suspension in an amount in the range of from about 50% to about 250% by weight of said water in said suspension.

11. The suspension of claim 7 wherein said suspension further comprises a colloidal material selected from the group consisting of carbon black, lignite, brown coal, humic acid, styrene-butadiene rubber latexes, polyvinyl alcohol latexes, acetate latexes, acrylate latexes, precipitated silica and pyrogenic silica.

12. The suspension of claim 7 wherein said suspension further comprises a clay selected from the group consisting of bentonite, attapulgite, kalonite, meta kalonite, hectorite and sepiolite.

13. The suspension of claim 7 wherein said suspending agent is present in said suspension in an amount in the range of from about 0.1% to about 100% by weight of said water in said suspension.

14. A storable water-silica suspension for use in well cement compositions comprising: water; silica selected from the group consisting of micro-silica, fine silica flour, silica flour, sand and mixtures thereof present in said suspension in an amount in the range of from about 50% to about 250% by weight of water therein; and a colloidal suspending agent selected from the group consisting of carbon black, lignite, brown coal, humic acid, styrene-butadiene rubber latexes, polyvinyl alcohol latexes, acetate latexes, acrylate latexes, precipitated silica and pyrogenic silica present in said suspension in an amount in the range of from about 25% to about 100% by weight of water therein, wherein the suspension further comprises a copolymer of 2-acrylamido-2-methylpropane sulfonic acid and N,N-dimethylacrylamide.

15. The suspension of claim 14 wherein said water is selected from the group consisting of fresh water and salt water.

16. A storable water-silica suspension for use in well cement compositions comprising: water; silica selected from the group consisting of micro-silica, fine silica flour, silica flour, sand and mixtures thereof present in said suspension in an amount in the range of from about 50% to about 250% by weight of water therein; and a clay suspending agent selected from the group consisting of bentonite, affapulgite, kalonite, meta kalonite, hectorite and sepiolite present in said suspension in an amount in the range of from about 0.5% to about 8% by weight of water therein, wherein the suspension further comprises a copolymer of 2-acrylamido-2-methylpropane sulfonic acid and N,N-dimethylacrylamide.

17. The suspension of claim 16 wherein said water is selected from the group consisting of fresh water and salt water.

18. A storable water-silica suspension for use in well cement compositions comprising: water; silica selected from the group consisting of micro-silica, fine silica flour, silica flour, sand and mixtures thereof present in said suspension in an amount in the range of from about 50% to about 250% by weight of water therein; and a polymer suspending agent comprising a copolymer of 2-acrylamido-2-methylpropane sulfonic acid and N,N-dimethylacrylamide present in said suspension in an amount in the range of from about 0.1% to about 3% by weight of water therein.

19. The suspension of claim 18 wherein said water is selected from the group consisting of fresh water and salt water.

20. The suspension of claim 1 wherein said suspension further comprises a colloidal material.

21. The suspension of claim 1 wherein said suspension further comprises a clay.

22. The suspension of claim 1 wherein said suspension further comprises carbon black.

23. The suspension of claim 1 wherein said suspension further comprises bentonite.

24. The suspension of claim 14 wherein said colloidal suspending agent is carbon black.

25. The suspension of claim 16 wherein said clay suspending agent is bentonite.

* * * * *